Feb. 16, 1960 J. F. HARPER 2,925,137
BATTERY MOUNTING STRUCTURE
Filed May 24, 1957 2 Sheets-Sheet 1

INVENTOR.
JOHN F. HARPER
BY John W. Michael
ATTORNEY

INVENTOR.
JOHN F. HARPER
BY John W. Michael
ATTORNEY

United States Patent Office

2,925,137
BATTERY MOUNTING STRUCTURE

John Fletcher Harper, Milwaukee, Wis., assignor to Globe-Union Inc., Milwaukee, Wis., a corporation of Delaware Application May 24, 1957, Serial No. 661,491

5 Claims. (Cl. 180—68.5)

This invention relates to a battery mounting structure and particularly to structure for mounting batteries in various makes and models of automobiles.

The battery mounting structure supplied in automobiles varies from make to make and from model to model requiring a line of batteries having a great variety of sizes and shapes to supply the replacement battery market. Capital, space and maintenance requirements make it impossible for many dealers to carry a complete line of batteries.

The object of this invention, therefore, is to provide a means for mounting batteries in automobiles of various makes and models requiring only a few simple and inexpensive parts in addition to a portion of the existing battery mounting structure in such automobiles.

These objects are attained by a bracket having an upper portion with a lip thereon for engaging a shoulder formed on the top of the battery cover to restrain movement of the bracket away from the battery and having a lower portion rigidly connected to the upper portion and spaced therefrom which abuts the side walls of the battery to restrain movement of the bracket toward the battery. The bracket has a hold-down portion rigidly connected to the upper and lower portions and extending laterally therefrom adapted for engagement with existing hold-down rods spaced at various distances from the battery.

The hold-down portion of each bracket may be spaced below the upper portion to provide a modified bracket for use with short hold-down rods or with a battery of greater height.

The shoulders formed on the top of the battery cover for engagement by the lip on each bracket may be formed by a ridge extending from the top of the cover, by a groove formed in the top of the cover or by other suitable means.

Other objects and advantages will be pointed out in, or be apparent from the specification and claims, as will obvious modifications of the several embodiments shown in the drawings, in which:

Figure 1:
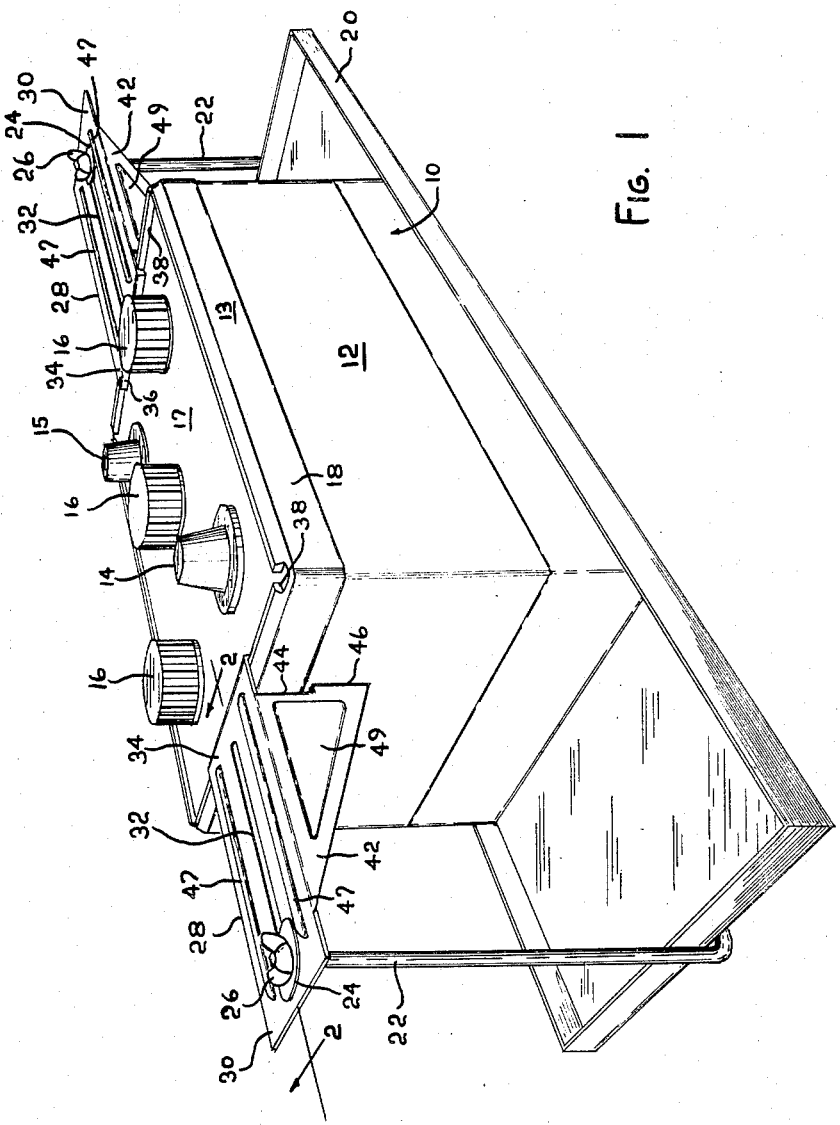
Fig. 1 is a perspective view of a battery mounting structure embodying my invention.

Referring to the drawings in detail, Fig. 1 shows a battery 10 having a rectangular casing 12, cover 13, terminal posts 14 and 15 and filling caps 16. Cover 13 may be of one-piece construction as shown with a top 17 formed integral with depending side walls 18. The cover is assembled in interlocking engagement with the battery casing 12 with the top portions of the casing walls disposed in vertically extending grooves 19 in side walls 18 of the cover. Battery 10, as will be explained hereinafter, may be mounted in a variety of different makes and models of automobiles.

A battery pan 20, along with hold-down rods 22, washers 24 and wing nuts 26, are typical of the existing battery mounting structure in an automobile. The length and width of pan 20 and the length and spacing of rods 22 vary depending on the make and model of the automobile.

To facilitate installation of a battery in various existing battery mounting structures, brackets 28 are provided. The brackets have flat or hold-down portions 30 with slot-like openings 32 through which the threaded ends of hold-down rods 22 extend at various distances from the battery depending on the spacing of the rods.

Flat portion 30 has a finger or upper portion 34 projecting from one end thereof with a lip 36 at its end forming a shoulder for engagement with a shoulder 38 formed on the top of the battery to restrain movement of the bracket away from the battery. The one-piece construction of cover 13 and the tongue and groove assembly of the cover and casing uniformly distribute the stresses produced by lips 36 to prevent damage to the battery.

Figure 2:
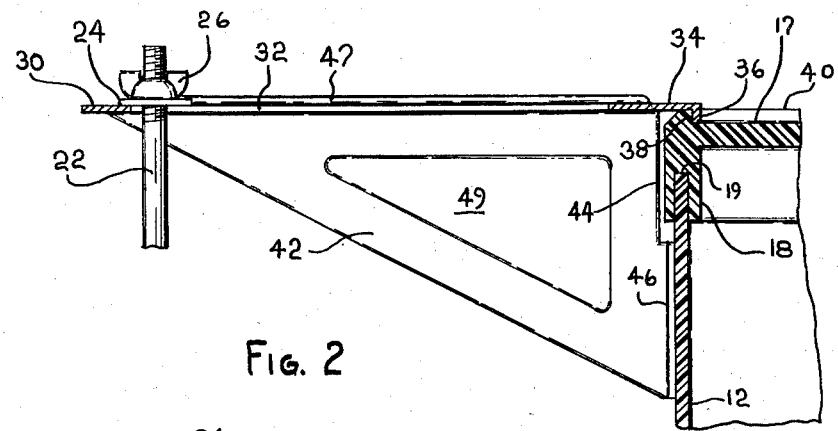
Fig. 2 is a sectional view taken along line 2—2 of Fig. 1.
Figure 3:
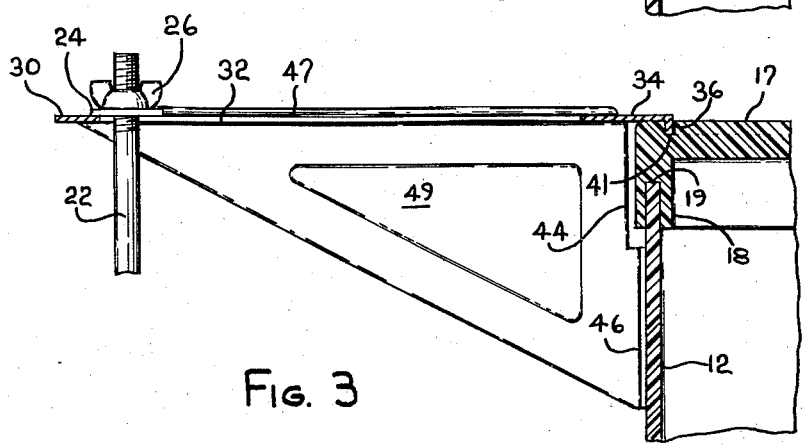
Fig. 3 is a view similar to Fig. 2 but showing a modified battery top construction.

As shown in Fig. 2, shoulder 38 may be formed by a ridge 40 extending around the periphery of cover 13. Fig. 3 shows a slight modification of the shoulders 38 formed in the battery cover wherein, instead of being formed by a ridge, is formed by a groove 41 which extends along each end or side or both of the cover. Other suitable means for forming shoulders on the battery, such as by buttons or pegs extending therefrom, may be employed.

Depending at substantially right angles from the flat portion 30 of the brackets are legs or lower portions 42 of substantially triangular configuration with vertical edges 44 on which abutments 46 are formed for contact with the end walls of the battery. Abutments 46 are spaced from lips 36 and are formed by ears bent over at right angles with legs 42 to lay flat against the end walls of the battery. It should be understood, however, that any other suitable arrangement for providing a surface or point of contact between the bracket and the side wall spaced from the lips would produce the desired result.

Abutments 46 act as fulcrums about which the brackets are pivoted slightly as wing nuts 26 are turned down on hold-down rods 22 thereby moving lips 36 into tight contact with shoulders 38 of the battery. The elongated slot-like openings 32 in the brackets will accommodate hold-down rods spaced at various distances from the end of the battery and therefore will facilitate installation of a battery in automobiles which have mounting rods spaced at various distances apart. Other means for adjustably mounting the brackets such as a series of spaced openings could be provided for this purpose.

Ribs 47 and offset areas 49 may be formed in flat portions 30 and legs 42, respectively, to reinforce the brackets or, where conditions permit, these areas may be cut out to lighten the brackets. The brackets shown and described are made from a single stamping with the legs, abutments and lip formed by bending at the proper places to provide a simple and inexpensive structure for mounting batteries in various makes and models of automobiles.

Figure 4:
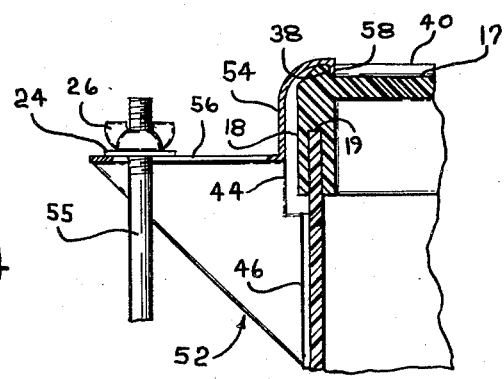
Fig. 4 is a view similar to Fig. 2 showing a modified bracket.

Fig. 4 shows a slightly modified bracket 52 adapted for hold-down structure having relatively short hold-down rods 55. To compensate for the shorter rods a modified finger or upper portion 54 is provided extending upwardly from one edge of flat hold-down rod engaging portion 56 with a lip 58 formed at the end and spaced above portion 56. Finger 54 curves over the top edge of the battery for engagement of lip 58 with shoulder 38 on the battery.

Although several embodiments of the present invention have been illustrated and described, it will be apparent to those skilled in the art that various changes and modifications may be made therein without departing from the spirit of the invention or from the scope of the appended claims.

I claim:

1. A bracket for securing a battery in adjusted positions by vertical hold-down rods spaced at various distances from the ends of the battery comprising, a flat horizontally extending hold-down portion having an elongated slot-like opening through which the end of a hold-down rod extends, said portion having a lip at one end thereof forming a shoulder for engagement with a shoulder formed on the top of the battery to restrain movement of the bracket away from the battery, a pair of vertical legs integral with and depending from said hold-down portion along the lengthwise edges thereof, and an abutment on each of said legs spaced from said lip and contacting a side of the battery to restrain movement of the bracket toward the battery, said abutments acting as fulcrums about which the bracket is pivoted slightly as said hold-down portion is tightened down on the hold-down rod to thereby move said lip into tight contact with the shoulder on the battery.

2. Apparatus for mounting a battery having a casing and terminal posts in automobiles having hold-down rods spaced at various distances apart comprising, a cover for a battery casing including a top member which is imperforate except for filling openings and openings to accommodate terminal posts, said top member having a periphery substantially coextensive with a battery casing and depending side walls fastened to the entire length of its periphery, said side walls adapted for engagement with a battery casing to prevent horizontal movement of said cover on a battery casing, a shoulder on said cover and connected with said top member whereby stresses on said shoulder are transmitted through said top member to all parts of said cover, and a bracket including a first portion adapted for engagement with said shoulder to restrain movement of said bracket away from said cover, said bracket having a second portion adapted to abut a side surface of a battery to restrain movement of said bracket toward a battery, said bracket having a third portion extending laterally from said first and second portions and adapted to be engaged by a hold-down rod at various distances from a battery.

3. Apparatus according to claim 2 in which said depending side walls of said cover have vertically extending grooves therein to adapt said side walls for interlocking engagement with a battery casing.

4. Apparatus according to claim 2 in which there is a shoulder along each edge of said cover top so that a bracket can be installed on any side of said cover.

5. Apparatus for mounting a battery having a casing and terminal posts in automobiles having hold-down rods spaced at various distances apart comprising, a cover for a battery casing including a top member which is imperforate except for filling openings and openings to accommodate terminals posts, said top member having a periphery substantially coextensive with a battery casing and depending side walls fastened to the entire length of its periphery, said side walls adapted for engagement with a battery casing to prevent horizontal movement of said cover on a battery casing, a pair of shoulders on said cover facing each other and connected to said top member whereby stresses on said shoulders are transmitted through said top member to all parts of said cover, and a pair of brackets each including a first portion adapted for engagement with one of said shoulders to restrain movement of said brackets away from said cover, each of said brackets having a second portion adapted to abut a side surface of a battery to restrain movement of said brackets toward a battery and each of said brackets having a third portion extending laterally from said first and second portions and adapted to be engaged by a hold-down rod at various distances from a battery.

References Cited in the file of this patent

UNITED STATES PATENTS

| 783,099 | Bryant | Feb. 21, 1905 |
| 1,172,347 | Ford | Feb. 22, 1916 |
| 1,607,908 | Nelson | Nov. 23, 1926 |
| 1,772,847 | Taylor | Aug. 12, 1930 |